United States Patent [19]
Jones

[11] Patent Number: 5,993,114
[45] Date of Patent: Nov. 30, 1999

[54] APPARATUS AND METHOD FOR PIPELINE RENOVATION

[75] Inventor: Gerald Melville Aubrey Jones, Ashton Keynes, United Kingdom

[73] Assignee: WRC PLC, Marlow, United Kingdom

[21] Appl. No.: 09/003,685

[22] Filed: Jan. 7, 1998

[51] Int. Cl.[6] .................................................. E21D 11/04
[52] U.S. Cl. ........................ 405/150.1; 405/146
[58] Field of Search ................................. 405/154, 150.1, 405/146; 156/294, 287, 156, 293, 94; 138/97, 98

[56] References Cited

U.S. PATENT DOCUMENTS

| | | | |
|---|---|---|---|
| 3,422,631 | 1/1969 | Silverman | 405/155 |
| 3,494,813 | 2/1970 | Lawrence et al. | 405/150.1 X |
| 4,626,133 | 12/1986 | Waring | 405/107 |
| 4,714,095 | 12/1987 | Muller et al. | 138/98 |
| 5,653,555 | 8/1997 | Catallo | 405/154 |

FOREIGN PATENT DOCUMENTS

| | | |
|---|---|---|
| 0 184 366 | 11/1986 | European Pat. Off. . |
| 1 602 602 | 11/1981 | United Kingdom . |
| 2 082 285 | 3/1982 | United Kingdom . |
| 2 176 867 | 7/1987 | United Kingdom . |
| 2 250 565 | 10/1992 | United Kingdom . |

OTHER PUBLICATIONS

International Publication No. WO 94/04349, dated Mar. 3, 1994.

*Primary Examiner*—David Bagnell
*Assistant Examiner*—Sunil Singh

[57] ABSTRACT

A method of providing an internal lining in a pipeline. The method comprises inverting a tubular liner within said pipeline, said liner having a cementitious coating on a surface thereof. This brings the cementitious material into contact with the wall of the pipeline.

26 Claims, 2 Drawing Sheets

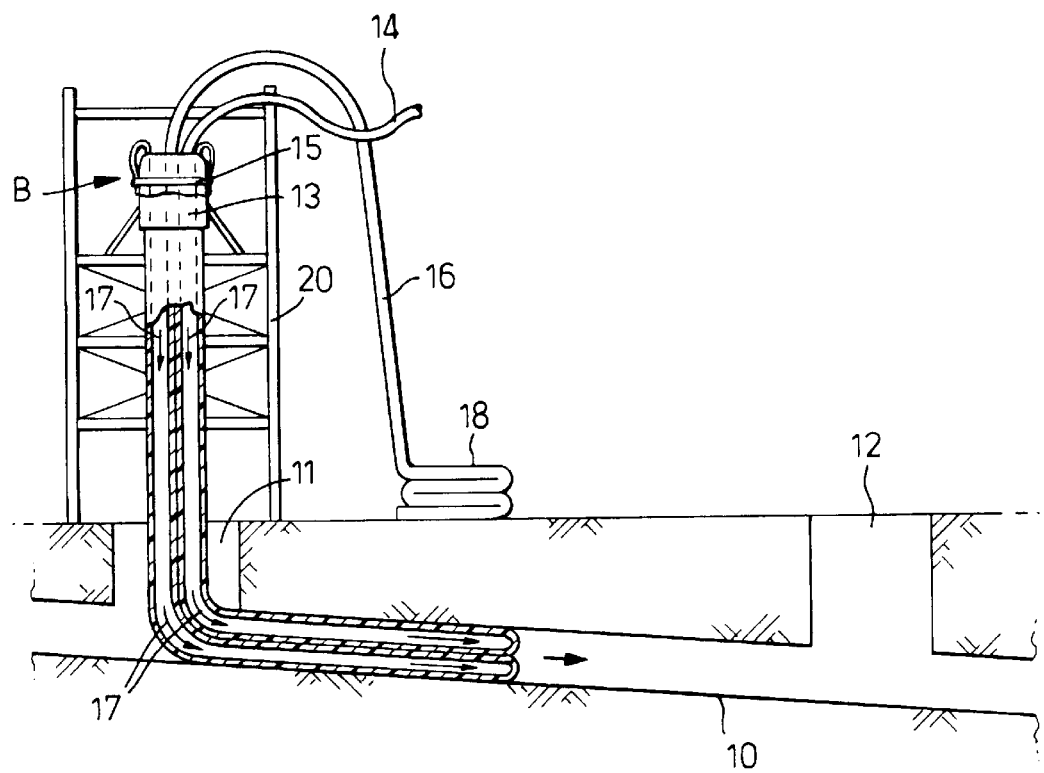

APPARATUS AND METHOD FOR PIPELINE RENOVATION

BACKGROUND OF THE INVENTION

This invention relates to a method and apparatus for pipeline renovation, and more particularly to the internal renovation of liquid-carrying pipelines.

It is well known that, over a period of time, liquid-carrying pipelines can suffer internal corrosion and breakdown which can result, for example, in leaks and in contamination of the liquid passing therethrough. Since complete replacement of a pipeline can be extremely expensive, attempts have been made to renovate older pipelines by providing an internal lining therein to cover the internal wall and keep the liquid out of contact therewith. In the water industry, linings have been provided in a number of ways.

In one technique, a process known as inversion is used. An inverted lining is formed by allowing a flexible cylindrical liner to be turned inside out within the pipeline, and pressed radially outwardly against the inside wall of the pipeline. The inverted liner has a resin coating on its outer surface, and as the inverted liner is pressed against the inside wall of the pipeline, the liner becomes bonded by the resin to the inner wall of the pipeline. Inversion of the cylindrical liner can be effected by air or water, as will be understood by those skilled in the art. These linings, when cured, are semi-structural.

Whilst the inversion technique has proved satisfactory, there is a disadvantage especially when lining water mains in that organic compounds from the resin can permeate the liner and contaminate the water supply. Because of this, inverted linings require lengthy and expensive testing before their safety for use in contact with potable water can be ensured.

BRIEF SUMMARY OF THE INVENTION

We have now found a way in which this problem can be reduced or overcome. According to the present invention, a cementitious grout, mortar or powder is used in place of the organic resin. In this way, the risk of pollution is significantly reduced. Further, cement is a relatively inexpensive commodity. Also, cement can provide additional corrosion protection for ferrous pipelines because the high pH generated within the cement inhibits the corrosion process.

Thus, in one aspect, the invention provides a method of providing an internal lining in a pipeline, which method comprises applying a liner by inversion, the liner having a cementitious coating on the surface to contact the internal wall of the pipeline.

The liner can be of any of the types used in the inversion process. We prefer to use an open-matrix backed lining, suitable for impregnation with cement grout, mortar or powder. The linings are typically made of flexible materials such as polyester or glass fibre mesh. Plastics films, eg. of polyethylene, polypropylene, polybutylene or polyethylene terephthalate would be suitable, and typically have a thickness of up to say, 3 mm.

The composition of the cementitious grout, mortar or powder, is not critical, although it needs to be suitable for use in the particular environment envisaged. In one environment, for example, the open-matrix backed lining would be impregnated with cement grout or mortar on site and then inverted. In another environment, the open-matrix backed lining would be factory impregnated with cement powder, wetted on site, then inverted.

BRIEF DESCRIPTION OF THE DRAWINGS

In order that the invention may be more fully understood, embodiments thereof will now be described, by way of example only, with reference to the accompanying drawings, in which:

FIG. 2 is a schematic vertical section of an embodiment of apparatus for carrying out the process of the invention.

DETAILED DESCRIPTION OF THE INVENTION

Figure 1:
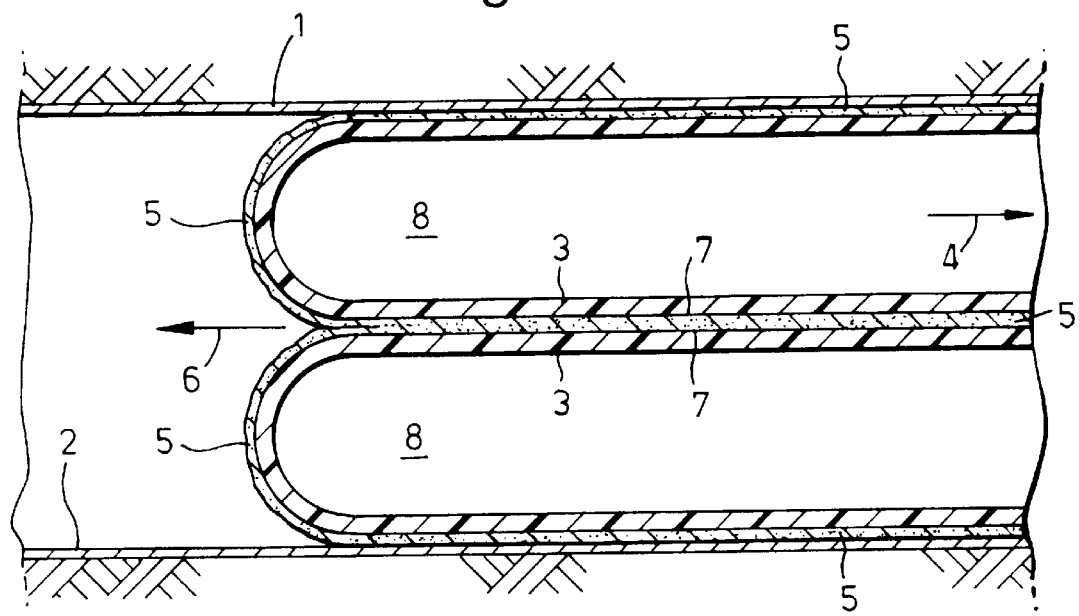
FIG. 1 is a schematic axial section through a pipeline within which the inversion process of the invention is being effected.

Referring to FIG. 1, there is shown a pipeline 1 having an internal surface 2. A cylindrical flexible liner 3 is secured to the surface 2 around the periphery of the liner 3, at a region (not shown) in the direction of arrow 4. The liner is un-inverted with its inner surface 7 in contact with a cementitious filling 5. Air, water or other fluid is then introduced around the outside of the liner, which is thus caused to travel (in the direction of arrow 6) in the pipeline, and to invert. Thus, the inner grout/mortar coated surface 7 is inverted and, by the fluid pressure in annulus 8, is pressed against the inner surface 2 of pipeline 1. The grout/mortar is sandwiched between the liner surface 7 and the wall surface 2, and thus binds the liner to the inner surface 2 of pipeline 1. In this way, the liner is applied to the surface 2.

As will be appreciated, before a lining can be applied in a pipeline by the method of the invention, the pipeline must firstly be located (eg. by excavation), the water supply stopped, and the renovation length prepared as appropriate for the inversion technique to be used. This includes making cut-outs, draining, cleaning and drying the main.

Referring to FIG. 2, there is shown a subterranean pipeline 10 with exposed access chambers 11 and 12. Above chamber 11 is an inversion tower 20 including a tubular sleeve 13 mounted over the chamber 11. A water supply line 14 is provided to the inside of sleeve 13. Sleeve 13 has an outer clamp band 15 whereby the end of a liner tube 16 can be secured around the outside of the sleeve 13. The liner is initially in un-inverted condition 18 outside sleeve 13.

In order to line the inside of pipeline 10, water is pumped into liner tube 16 inside sleeve 13. The water pressure pushes the liner downwards into chamber 11 and from there into pipeline 10. The water flow direction is shown by arrows 17. The line tube 16 is coated with cementitious material, and lines the pipeline 10 in the same manner as described with reference to FIG. 1.

Figure 3:
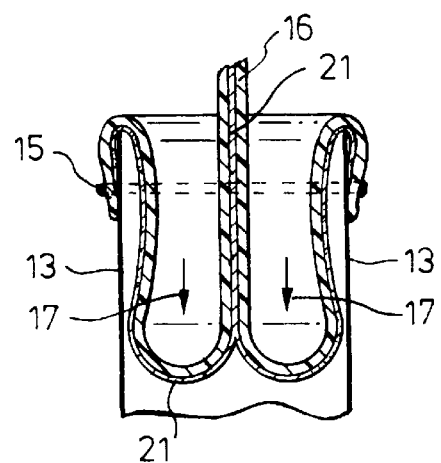
FIG. 3 is an enlarged view of part B of FIG. 2.

FIG. 3 shows on an enlarged scale the region B of FIG. 2, except that the liner tube 16 is in its initial position, i.e. clamped to sleeve 13 but before the water pressure is applied (in the direction of arrows 17). FIG. 3 also shows the cementitious material 21 on the inner surface of the un-inverted liner tube 16.

Whilst the invention has been particularly described with reference to the renovation of water pipelines, it is also applicable mutatis mutandis to pipelines carrying other fluids, as will be clear to those skilled in the art.

I claim:

1. A method of renovating a substantially rigid pipe comprising, providing a tubular liner having a first surface facing inwardly of said liner and a second surface facing outwardly of said liner including the step of providing a nonresinous cementitious coating disposed on said first surface, inverting said liner adjacent one end of said liner and moving a portion of said liner along the length of said pipe to progressively cause said first surface to face outwardly of said liner and to come into direct contact with the inner surface of the pipe without contacting any other material so that said coating comprises the only material between the pipe and the liner, while concurrently causing said second surface to progressively face inwardly of said liner.

2. A method as defined in claim 1 wherein said liner comprises an open-matrix backed lining.

3. A method as defined in claim 1 wherein said liner is a flexible material.

4. A method as defined in claim 1 wherein said liner comprises a polyester mesh.

5. A method as defined in claim 1 wherein said liner comprises a glass fiber mesh.

6. A method as defined in claim 1 wherein said liner comprises a plastic film.

7. A method as defined in claim 6 wherein said plastic film comprises a material selected from the group consisting of polyethylene, polypropylene, polybutylene, or polyethylene terephthalate.

8. A method as defined in claim 1 wherein said liner has a thickness, said thickness being less than about 3 mm.

9. A method as defined in claim 1 wherein the step of providing the liner with a coating comprises applying mortar to said liner.

10. A method as defined in claim 1 wherein said coating is a powder, and wherein the step of providing the liner with a coating comprises the step of wetting said powder to form mortar.

11. An apparatus for renovating a pipe comprising: a flexible liner having a wall-contacting surface, wherein a substantial portion of said wall-contacting surface has a non-resinous cementitious coating thereon, said liner being invertible under the influence of internal fluid pressure to press said wall-contacting surface directly against an internal surface of the pipe.

12. The apparatus as defined in claim 11 wherein said non-resinous coating comprises cementitious mortar.

13. The apparatus as defined in claim 12 wherein said mortar comprises a grout.

14. The apparatus as defined in claim 11 wherein said liner comprises an open matrix backing.

15. The apparatus as defined in claim 11 wherein said liner comprises polyester mesh.

16. The apparatus as defined in claim 11 wherein said liner comprises glass-fiber mesh.

17. The apparatus as defined in claim 11 wherein said liner comprises plastic film.

18. The apparatus as defined in claim 17 wherein said plastic film comprises polyethylene.

19. The apparatus as defined in claim 17 wherein said plastic film comprises polypropylene.

20. The apparatus as defined in claim 17 wherein said plastic film comprises polybutylene.

21. The apparatus as defined in claim 17 wherein said plastic film comprises polyethylene terephthalate.

22. The apparatus as defined in claim 11 wherein said liner has a thickness of less than about 3 mm.

23. The liner as defined in claim 11 wherein said liner is generally tubular.

24. A method of renovating a pipe comprising: providing a generally cylindrical liner having a wall-contacting surface on which a non-resinous cementitious coating is provided; clamping one end of said liner to the pipe with the coating facing an outer surface of the pipe; and inverting the liner by introducing a fluid into the liner so as to directly contact an inner surface of the pipe with the coating.

25. The method as defined in claim 24 wherein said coating is applied on-site as a mortar.

26. The method as defined in claim 24 wherein said coating is applied as a powder.

* * * * *